US007392610B2

(12) United States Patent
Jedlicka et al.

(10) Patent No.: US 7,392,610 B2

(45) Date of Patent: Jul. 1, 2008

(54) PORTABLE INFORMATION SIGN DEVICES

(75) Inventors: Maya Paulina Jedlicka, Tyler, TX (US); Wing Yue Leung, San Jose, CA (US); Johnny Wayne Boudreaux, Dallas, TX (US)

(73) Assignee: Total Terry, LLC, Dallas, TX (US)

( * ) Notice: Subject to any disclaimer, the term of this patent is extended or adjusted under 35 U.S.C. 154(b) by 490 days.

(21) Appl. No.: 11/087,145

(22) Filed: Mar. 23, 2005

(65) Prior Publication Data

US 2006/0225319 A1 Oct. 12, 2006

(51) Int. Cl.

| | |
|---|---|
| ***F16M 11/00*** | (2006.01) |
| ***F16M 11/02*** | (2006.01) |
| ***F16M 11/24*** | (2006.01) |
| ***F16M 11/38*** | (2006.01) |
| ***F16M 13/00*** | (2006.01) |
| ***E01F 9/00*** | (2006.01) |
| ***G09F 17/00*** | (2006.01) |
| ***G09F 3/00*** | (2006.01) |
| ***E04H 15/28*** | (2006.01) |
| ***E04H 12/20*** | (2006.01) |
| ***A45B 25/12*** | (2006.01) |

(52) U.S. Cl. ......................... 40/310; 248/159; 248/165; 248/166; 248/168; 248/170; 248/171; 248/178.1; 248/405; 116/63 P; 116/173; 135/98; 135/37; 52/146

(58) Field of Classification Search .................. 40/310, 40/610; 52/146; 116/63 P, 63 R, 173; 248/165, 248/166, 431, 161, 162.1, 404–414, 169, 248/171; 211/191; 135/100, 121, 139, 143, 135/147, 151, 128

See application file for complete search history.

(56) References Cited

U.S. PATENT DOCUMENTS

| | | | | |
|---|---|---|---|---|
| 2,090,783 | A | | 8/1937 | Chinn |
| 3,200,786 | A | | 8/1965 | Swezy et al. |
| D216,843 | S | | 3/1970 | Lew |
| 3,777,428 | A | | 12/1973 | Caufield |
| 4,256,050 | A | | 3/1981 | Barnard |
| 4,426,801 | A | | 1/1984 | Gates |
| D273,095 | S | | 3/1984 | Schulze |
| 4,462,145 | A | | 7/1984 | Schulze |
| 4,705,251 | A | * | 11/1987 | Samuelsson ................ 248/171 |

(Continued)

FOREIGN PATENT DOCUMENTS

GB 1 395 169 5/1975

*Primary Examiner*—Lesley D. Morris
*Assistant Examiner*—Syed A Islam
(74) *Attorney, Agent, or Firm*—Vincent J. Allen; Carstens & Cahoon, LLP

(57) ABSTRACT

The present invention relates to a portable information sign device. In one embodiment of the invention, a top plate comprises a foundation and three plate coupling ports. A center arm comprises an arm rod axially coupled to the top plate foundation. A sliding plate is slideably coupled to the arm rod and comprises a sliding plate foundation and three sliding plate coupling ports. A spring encircling the arm rod is connected on a first end to the sliding plate foundation and on a second end to a stop coupled to the distal end of the arm rod. Three guide arms are connected to the coupling ports of the sliding plate foundation. Three legs are connected on one end to the coupling ports in the top plate and on the leg end to coupling ports on the guide arms.

23 Claims, 6 Drawing Sheets

U.S. PATENT DOCUMENTS

| | | | |
|---|---|---|---|
| 4,815,784 | A | 3/1989 | Zheng |
| 5,038,812 | A | 8/1991 | Norman |
| 5,115,343 | A | 5/1992 | Bennett |
| D329,016 | S | 9/1992 | Scarpa |
| 5,199,375 | A | 4/1993 | Johson |
| 5,213,147 | A | 5/1993 | Zheng |
| 5,225,254 | A | 7/1993 | Foulke |
| 5,301,705 | A | 4/1994 | Zheng |
| 5,358,440 | A | 10/1994 | Zheng |
| 5,452,934 | A | 9/1995 | Zheng |
| 5,467,794 | A | 11/1995 | Zheng |
| 5,560,385 | A | 10/1996 | Zheng |
| D375,421 | S | 11/1996 | Weiner |
| 5,579,799 | A | 12/1996 | Zheng |
| 5,618,246 | A | 4/1997 | Zheng |
| D381,051 | S | 7/1997 | Zheng |
| 5,664,596 | A | 9/1997 | Zheng |
| D390,897 | S | 2/1998 | Wade |
| 5,722,446 | A | 3/1998 | Zheng |
| 5,778,915 | A | 7/1998 | Zheng |
| 5,816,279 | A | 10/1998 | Zheng |
| 5,816,954 | A | 10/1998 | Zheng |
| 5,845,697 | A | 12/1998 | Zheng |
| 5,860,237 | A | 1/1999 | Johnson |
| 5,901,926 | A | 5/1999 | Zheng |
| 5,941,265 | A | 8/1999 | Zheng |
| 5,950,969 | A | 9/1999 | Bennett et al. |
| 5,975,101 | A | 11/1999 | Zheng |
| 6,006,772 | A | 12/1999 | Zheng |
| 6,030,300 | A | 2/2000 | Zheng |
| 6,032,685 | A | 3/2000 | Zheng |
| 6,045,093 | A | 4/2000 | Zheng |
| 6,073,283 | A | 6/2000 | Zheng |
| 6,073,643 | A | 6/2000 | Zheng |
| 6,082,386 | A | 7/2000 | Zheng |
| 6,092,544 | A | 7/2000 | Zheng |
| 6,098,349 | A | 8/2000 | Zheng |
| 6,119,621 | A | 9/2000 | Johnson |
| 6,138,701 | A | 10/2000 | Zheng |
| 6,155,281 | A | 12/2000 | Zheng |
| 6,192,635 | B1 | 2/2001 | Zheng |
| 6,209,557 | B1 | 4/2001 | Zheng |
| 6,220,265 | B1 | 4/2001 | Zheng |
| 6,243,958 | B1 | 6/2001 | Ringley, Jr. |
| 6,264,573 | B1 | 7/2001 | Zheng |
| 6,266,904 | B1 | 7/2001 | Zheng |
| 6,267,128 | B1 | 7/2001 | Zheng |
| 6,267,129 | B1 | 7/2001 | Zheng |
| 6,269,826 | B1 | 8/2001 | Zheng |
| 6,273,368 | B1 | 8/2001 | Zheng |
| 6,289,910 | B1 | 9/2001 | Zheng |
| 6,305,396 | B1 | 10/2001 | Zheng |
| 6,318,394 | B1 | 11/2001 | Zheng |
| 6,325,086 | B1 | 12/2001 | Shinner et al. |
| 6,357,510 | B1 | 3/2002 | Zheng |
| 6,360,760 | B1 | 3/2002 | Louie et al. |
| 6,360,761 | B1 | 3/2002 | Zheng |
| 6,390,111 | B2 | 5/2002 | Zheng |
| 6,408,461 | B2 | 6/2002 | Zheng |
| 6,449,147 | B2 | 9/2002 | Zheng |
| 6,450,464 | B1 * | 9/2002 | Thomas ...................... 248/168 |
| 6,453,923 | B2 | 9/2002 | Zheng |
| 6,460,556 | B2 | 10/2002 | Zheng |
| 6,461,257 | B2 | 10/2002 | Zheng |
| 6,481,451 | B1 | 11/2002 | Zheng |
| 6,491,052 | B1 | 12/2002 | Zheng |
| 6,494,224 | B2 | 12/2002 | Zheng |
| 6,499,498 | B1 | 12/2002 | Zheng |
| 6,560,095 | B1 | 5/2003 | Zheng |
| 6,571,410 | B2 | 6/2003 | Zheng |
| 6,575,185 | B2 | 6/2003 | Zheng |
| 6,581,313 | B1 | 6/2003 | Zheng |
| 6,604,537 | B2 | 8/2003 | Zheng |
| 6,668,847 | B2 | 12/2003 | Zheng |
| 6,684,894 | B2 | 2/2004 | Zheng |
| 6,694,994 | B1 | 2/2004 | Zheng |
| 6,698,441 | B1 | 3/2004 | Zheng |
| 6,705,338 | B2 | 3/2004 | Zheng |
| 6,714,407 | B2 | 3/2004 | Zheng |
| 6,736,152 | B2 | 5/2004 | Zheng |
| 6,736,740 | B2 | 5/2004 | Zheng |
| 6,752,163 | B2 | 6/2004 | Zheng |
| 6,758,003 | B2 | 7/2004 | Zheng |
| 6,766,815 | B2 | 7/2004 | Zheng |
| 6,848,460 | B2 | 2/2005 | Zheng |
| 6,851,439 | B2 | 2/2005 | Zheng |
| 6,856,504 | B2 | 2/2005 | Zheng |
| 6,881,114 | B2 | 4/2005 | Zheng |
| 6,901,940 | B2 | 6/2005 | Zheng |
| 6,908,353 | B2 | 6/2005 | Zheng |
| 6,926,020 | B2 | 8/2005 | Zheng |
| 6,928,951 | B2 | 8/2005 | Huang |
| 7,031,147 | B2 | 4/2006 | Zheng |
| 7,047,681 | B2 | 5/2006 | Perelli |
| 7,048,654 | B2 | 5/2006 | Zheng |
| 7,073,523 | B2 | 7/2006 | Zheng |
| 7,080,653 | B2 | 7/2006 | Zheng |

* cited by examiner

PORTABLE INFORMATION SIGN DEVICES

TECHNICAL FIELD

The present invention relates generally to the field of mechanical devices and, more particularly, to portable information sign devices.

BACKGROUND

Operators of public and semi-public places often need to announce or otherwise provide information to members of the general public who travel into the places under the operators' control. One simple example situation is where a liquid has been spilled on the floor of a public place and the operator wishes to warn people walking near the area to avoid the wet floor, typically in order to prevent possible injury. This situation is common enough that a number of devices have been developed to inform people of wet floors.

Thus, plastic traffic cones and sandwich board type devices with "Wet Floor" painted or printed on them have become a recognizable feature of modern life. Typical plastic traffic cones, sandwich board type devices and other warning devices are often designed to provide maximum visibility. However, maximum visibility often entails a large size device, which can cause storage problems when the device is not in use. That is, the same feature that improves visibility and safety in typical devices can restrict the use of those devices where storage space is limited. Additionally, inconveniently stored devices can cause a trip hazard that can outweigh the benefits gained by warning people of slip hazards.

Other devices have been employed that seek to minimize storage space. However, many devices so designed are of limited usefulness in warning people of possible hazards. That is, the same feature that improves storability in typical devices can restrict the effectiveness of those devices when deployed. Additionally, some devices can be difficult to deploy from storage, requiring many steps to assemble the device or complicated unpacking or placement problems. Moreover, certain devices can themselves be somewhat hazardous to deploy. For example, certain spring-loaded devices where torsional coils are employed can sometimes be configured with such a high potential energy when stored that their deployment poses a risk to the operator.

Therefore, there is a need for a system and/or method for providing portable information sign devices that addresses at least some of the problems and disadvantages associated with conventional systems and methods.

SUMMARY

The present invention provides for a portable information sign device. A top plate comprises a top plate foundation and three top plate coupling ports. A center arm is coupled to the top plate, and comprises an arm rod axially coupled to the top plate foundation of the top plate, the arm rod comprising a first end coupled to the top plate foundation of the top plate and a distal end, a sliding plate slideably coupled to the arm rod and comprising a sliding plate foundation and three sliding plate coupling ports, a spring comprising a first end and a second end, the first end of the spring axially coupled to the sliding plate foundation and the spring encircling the arm rod, and a stop coupled to the distal end of the arm rod and the second end of the spring. A first guide arm is coupled to a first coupling port of the sliding plate and comprises a sliding plate end and a leg end. A second guide arm is coupled to a second coupling port of the sliding plate and comprises a sliding plate end and a leg end. A third guide arm is coupled to a third coupling port of the sliding plate and comprises a sliding plate end and a leg end. A first leg comprises a first end rotably coupled to a first coupling port of the top plate, a guide arm coupling port rotably coupled to the leg end of the first guide arm, and a distal end. A second leg comprises a first end rotably coupled to a second coupling port of the top plate, a guide arm coupling port rotably coupled to the leg end of the second guide arm, and a distal end. A third leg comprises a first end rotably coupled to a third coupling port of the top plate, a guide arm coupling port rotably coupled to the leg end of the third guide arm, and a distal end.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning particular dimensions, measurements, mechanical coupling techniques, materials composition, and the like, have been omitted inasmuch as such details are not considered necessary to obtain a complete understanding of the present invention, and are considered to be within the understanding of persons of ordinary skill in the relevant art.

Figure 1:
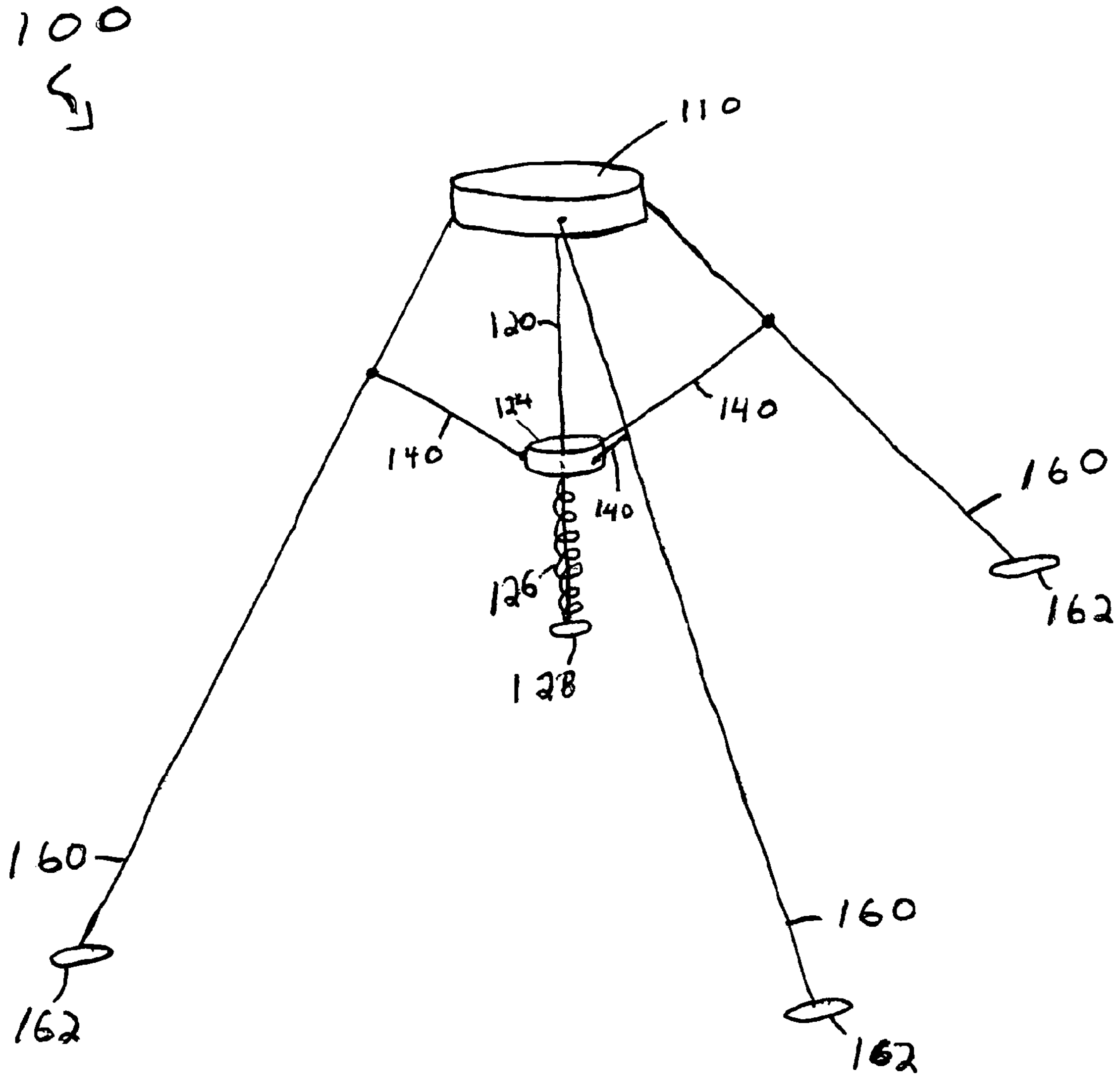
FIG. 1 is a block diagram depicting a portablR information sign device.

Referring to FIG. 1 of the drawings, the reference numeral 100 generally designates a portable information sign device. Generally, portable information sign device 100 includes a top plate 110, a center arm 120, a plurality of guide arms 140, and a plurality of legs 160. In particular, portable information sign device 100 includes top plate 110. Generally, top plate 110 includes a top plate foundation and a plurality of coupling ports, described in more detail below. Top plate 110 can be constructed of metal, plastic, or other durable material and can comprise a solid piece, a substantially hollow piece, a somewhat hollow piece, or otherwise suitably constructed. Top plate 110 can be configured as a generally circular plate, a generally triangular plate, a generally hexagonal plate, or otherwise suitably configured. In one embodiment, top plate 110 is constructed of a solid metal piece with six sides, having three sides of a particular length and three sides of a shorter length.

Top plate 110 is coupled to a center arm 120. Center arm 120 can be constructed of metal, plastic, or other durable, inflexible material. Generally, center arm 120 is a rod and can be configured as a substantially cylindrical rod, a triangular rod, a hexagonal rod, a polygonal rod, or otherwise suitably configured. In one embodiment, center arm 120 is a cylindrical rod of a length between one-third and one-half of a length of one of the plurality of legs 160. Center arm 120 includes a sliding plate 124, a spring 126, and a stop 128, described in more detail below.

Center arm 120 is coupled to each of the plurality of legs 160 through the plurality guide arms 140. Guide arms 140 can be constructed of metal, plastic, or other durable, inflexible material. In a particular embodiment, the plurality of guide arms 140 are coupled to the sliding plate 124 of center arm 120, as described in more detail below. In one embodiment, each guide arm 140 is configured with a single-rod end coupled to sliding plate 124 and a forked-end coupled to a leg 160. One skilled in the art will understand that other configurations can also be employed. As used herein, "each" means all of a particular subset.

Each guide arm 140 is coupled to a leg 160. Generally, each leg 160 is a rod and can be configured as a substantially cylindrical rod, a triangular rod, a hexagonal rod, a polygonal rod, or otherwise suitably configured. Each leg 160 can be constructed of metal, plastic, or other durable, inflexible or substantially inflexible material. In one embodiment, each leg 160 is a cylindrical rod of a common length between two to three times the length of center arm 120. In the illustrated embodiment, each leg 160 is coupled to top plate 110 at a top end and comprises a stop 162 at a distal end from the top end. Stop 162 can be a rubber end cap, a metal "foot", or other suitable end piece. In one embodiment, stop 162 can be omitted altogether, as one skilled in the art will understand. Additionally, in the illustrated embodiment, each leg 160 is also coupled to a guide arm 140. Moreover, in the illustrated embodiment, portable information sign device 100 includes three guide arms 140 and three legs 160. One skilled in the art will understand that other configurations can also be employed.

Generally, in operation, as described in more detail below, portable information sign device 100 operates in one of two modes of operation. In a first mode, or "open" mode, each leg 160 is at a maximum angle from the center arm 120. As described in more detail below, the maximum angle can be configured based on the length of each guide arm 140 and the particular point on leg 160 to which the guide arm 140 is coupled, as one skilled in the art will understand. Operating in the open mode, portable information sign device 100 is thus generally configured as a stable tripod, upon which an open pyramidal sign can be attached.

In a second mode, or "closed" mode, each leg 160 is at a minimum angle from the center arm 120. As described in more detail below, the minimum angle can also be configured based on the length of each guide arm 140 and the particular point on leg 160 to which the guide arm 140 is coupled, as one skilled in the art will understand. In a particular embodiment, when operating in the closed mode, each leg 160 is approximately parallel to the center arm 120. In an alternate embodiment, when operating in the closed mode, each leg 160 intersects with a point at which center arm 120 would extend to, if center arm 120 were the same length as each leg 160. One skilled in the art will understand that other configurations can also be employed. Thus, when operating in the closed mode, portable information sign device 100 is thus generally configured in a tube-like overall shape, which can increase the storability and/or transport of portable information sign device 100.

Figure 2:
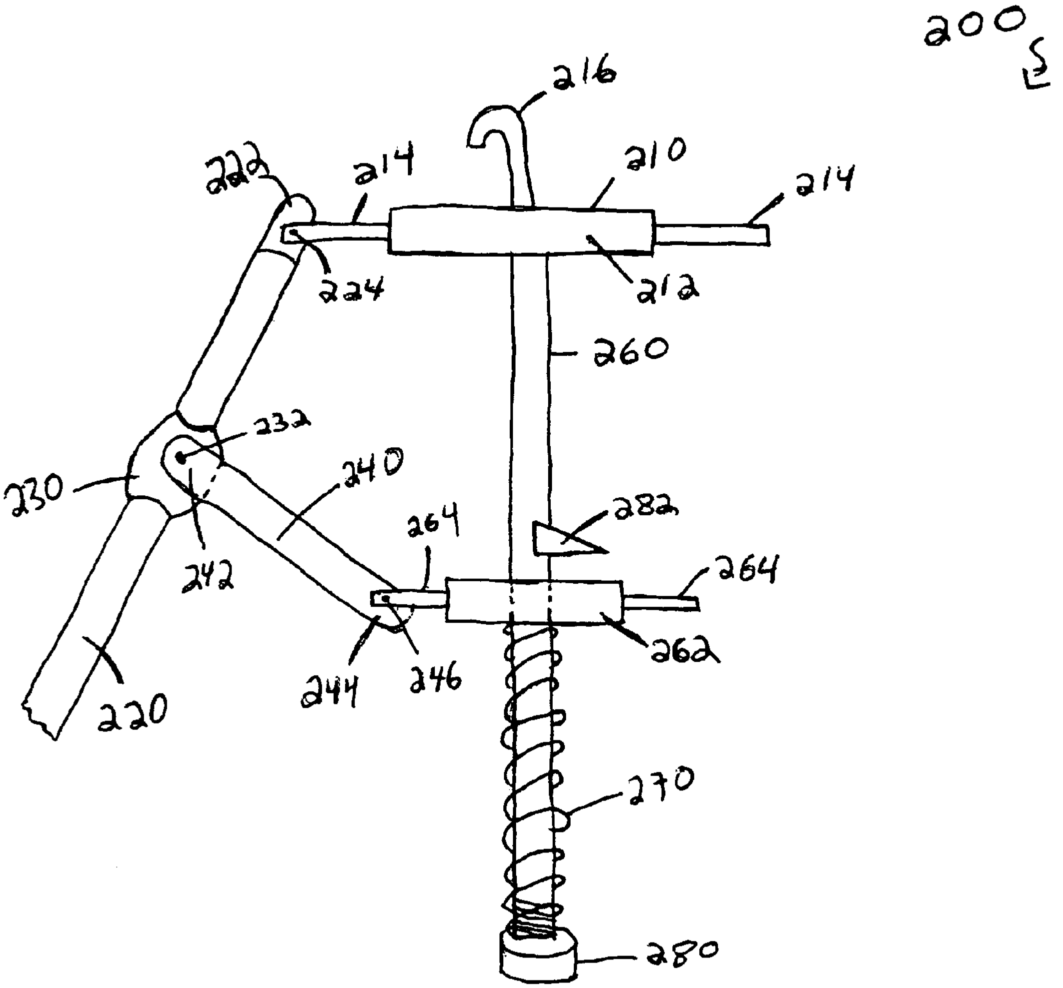
FIG. 2 is a block diagram depicting a portion of a portable information sign device.

Referring now to FIG. 2, the reference numeral 200 generally indicates a more detailed section of portable information sign device 100 of FIG. 2. In particular, FIG. 2 shows a top plate 210. Generally, top plate 210 includes a top plate foundation 212 and a plurality of coupling ports 214. Top plate foundation 212 can be constructed of metal, plastic, or other durable material and can comprise a solid piece, a substantially hollow piece, a somewhat hollow piece, or be otherwise suitably constructed. Top plate foundation 212 can be configured as a generally circular plate, a generally triangular plate, a generally hexagonal plate, or otherwise suitably configured. In one embodiment, top plate foundation 212 is constructed of a solid metal piece with six sides, having three sides of a particular length and three sides of a shorter length.

Top plate 210 includes a plurality of coupling ports 214. In the illustrated embodiment, coupling ports 214 are coupled to top plate foundation 212 along a horizontal axis of top plate foundation 212. In a particular embodiment, top plate foundation 212 is constructed of a solid metal piece with six sides, having three sides of a particular length and three sides of a shorter length, and one coupling port 214 is coupled to each of the three sides of a shorter length. Coupling ports 214 can be constructed from metal, plastic, or other suitable durable, inflexible material. In the illustrated embodiment, as described in more detail below, each coupling port 214 is configured as a set of prongs or tines to form a "fork" of a fork-and-pin type joint, as one skilled in the art will understand.

In the illustrated embodiment, a j-hook 216 is coupled to the top plate foundation 212 along a vertical axis of top plate foundation 212. J-hook 216 can be constructed from metal, plastic, or other suitable durable, inflexible material. In one embodiment, j-hook 216 is constructed out of the same material as top plate foundation 212. In an alternate embodiment, j-hook 216 and top plate foundation 212 are formed out of a common block of material. One skilled in the art will understand that other configurations can also be employed. Additionally, in the illustrated embodiment, j-hook 216 is configured such that the portable information sign device in which j-hook 216 is employed can be hung or otherwise mounted to a desired location. Thus, for example, when operating in the closed mode, the portable information sign device can be hung on a peg or hook on a wall for storage, through j-hook 216. Similarly, when operating in the open mode, the portable information sign device can be suspended on a rope or wire through j-hook 216, thereby increasing visibility of the portable information sign device.

Top plate 210 is coupled to a plurality of arms 220 through the plurality of coupling ports 214. In particular, each arm 220 is coupled to top plate 210 through an associated coupling port 214. Generally, each arm 220 is a rod and can be configured as a substantially cylindrical rod, a triangular rod, a hexagonal rod, a polygonal rod, or otherwise suitably configured. Additionally, each leg 160 can be constructed of metal, plastic, or other durable, inflexible material. As described above, in one embodiment, where coupling port 214 is configured as a fork of a fork-and-pin type joint, each leg 160 is configured with a top plate end 222 that is configured as a pin- or follower-end of a fork-and-pin type joint. Accordingly, top plate end 222 can include a retaining pin 224, which forms the axis of rotation for leg 220 about coupling port 214, as one skilled in the art will understand.

Additionally, each leg 220 is coupled to a guide arm 240 through a coupling port 230. In the illustrated embodiment, coupling port 230 is a section of leg 220 configured as a pin- or follower-end of a fork-and-pin type joint. Accordingly, coupling port 230 can include a regaining pin 232, which forms an axis of rotation about the fork-and-pin type joint, coupling leg 220 to guide arm 240. One skilled in the art will understand that other configurations can also be employed. Moreover, for ease of illustration, leg 220 is depicted in a truncated view and, accordingly, an end of leg 220 distal to top plate end 222 and/or a stop is not shown.

As shown in the illustrated embodiment, guide arm 240 is coupled to leg 220 at a leg end 242 of guide arm 240. Guide arm 240 can be constructed of metal, plastic, or other durable, inflexible material. As described above, in one embodiment, where coupling port 230 is configured as a pin- or follower-end of a fork-and-pin type joint, leg end 242 is configured as a fork end of a fork-and-pin type joint. As described in more detail below, guide arm 240 is also coupled to a center arm 260 at a center arm end 244 of guide arm 240. In the illustrated embodiment, center arm end 244 is configured as a pin- or follower-end of a fork-and-pin type joint. Accordingly, center arm end 244 can include a regaining pin 246, which forms an axis of rotation about the fork-and-pin type joint, coupling guide arm 240 to center arm 260. One skilled in the art will understand that other configurations can also be employed.

Center arm 260 is coupled to top plate foundation 212 of top plate 210. In particular, in the illustrated embodiment, center arm 260 is axially, fixedly coupled at or near a center point of top plate foundation 212. Center arm 260 can be constructed of metal, plastic, or other durable, inflexible material. Generally, center arm 260 is a rod and can be configured as a substantially cylindrical rod, a triangular rod, a hexagonal rod, a polygonal rod, or otherwise suitably configured. In one embodiment, center arm 260 is a cylindrical rod of a length between one-third and one-half of a length of one of the plurality of legs 220. In one embodiment, center arm 260 is a threaded cylindrical rod. Center arm 260 includes a sliding plate 262, a spring 270, and a stop 280, described in more detail below.

A sliding plate 262 is slidably coupled to center arm 260. Sliding plate 262 can be constructed of metal, plastic, or other durable, inflexible material. In a particular embodiment, sliding plate 262 includes an aperture (not shown) through which sliding plate 262 is coupled to center arm 260, such that sliding plate 262 can move, generally, in the direction of the axis of center arm 260. That is, the aperture of sliding plate 262, and therefore sliding plate 262, radially encircles a section of center arm 260. In an embodiment where center arm 260 is a cylindrical rod, the aperture of sliding plate 262 is configured as a circular aperture. In an embodiment where center arm 260 is a hexagonal rod, the aperture of sliding plate 262 is configured as a circular aperture. Thus, one skilled in the art will understand that the aperture of sliding plate 262 is configured to be suitable to the configuration of center arm 260. Sliding plate 262 includes a plurality of coupling ports 264. In one embodiment, each coupling port 264 is configured as a fork-end of a fork-and-pin type joint, and is coupled to a center arm end 244 of guide arm 240. One skilled in the art will understand that other configurations can also be employed.

Center arm 260 includes spring 270. Spring 270 is a spring and can be configured as a spiral or other suitable spring and can be constructed from metal, plastic, or other suitable material. In the illustrated embodiment, spring 270 is a metal spiral spring encircling center arm 260 along the axis of center arm 260 and is positioned between sliding plate 262 and a distal end of center arm 260 from top plate 210. Thus, when sliding plate 262 moves along center arm 260 away from top plate 210 and towards the distal end of center arm 260, sliding plate 264 compresses spring 270, which increases the force spring 270 exerts on sliding plate 264, as one skilled in the art will understand. For example, when leg 220 is moved towards center arm 260, the linkage to center arm 260 formed by guide arm 240 moves sliding plate 262 along center arm 260 towards the distal end of center arm 260, thereby compressing spring 270. Similarly, as one skilled in the art will understand, compressing spring 270 causes force to be applied to sliding plate 262, pushing against sliding plate 262 in the direction toward top plate 210 along center arm 260.

In the illustrated embodiment, the movement of sliding plate 262 along center arm 260 is restricted by a stop 280 at a distal end of center arm 260 and a retainer 282. Stop 280 is coupled to the end of center arm 260 distal to top plate 210 and can be constructed out of metal, plastic, or other suitable durable material. In one embodiment, stop 280 is a threaded nut and is configured to couple to the distal end of center arm 260, thereby allowing stop 280 to be threaded along center arm 260 at a variety of distances from top plate 210. In an alternate embodiment, stop 280 can be configured as a raised ridge or nub at the distal end of center arm 260. One skilled in the art will understand that other configurations can also be employed. Thus, in the illustrated embodiment, spring 270 can be coupled to stop 280 and sliding plate 262.

Retainer 282 is coupled to center arm 260 between sliding plate 262 and top plate 210. Retainer 282 can be constructed out of metal, plastic, or other suitable durable material. Retainer 282 can be configured as a washer, a nut, a raised ridge or nib, or otherwise suitably configured. Retainer 282 can be fixedly coupled to center arm 260 or can be configured to allow adjustment by a user. For example, retainer 282 can be a threaded nut that can be positioned at a desired location along center arm 260. Thus, in one embodiment, adjustment of stop 280 and retainer 282 can restrict the range of movement of sliding plate 262 along center arm 260 to within desired limits.

In an alternate embodiment, the movement of sliding plate 262 along center arm 260 toward top plate 210 is restricted by the configuration of guide arm 240. In particular, the length of guide arm 240 and the particular point on leg 220 to which guide arm 240 is coupled determines the closest point along center arm 260 to top plate 210 that sliding plate 262 can reach. One skilled in the art will understand that other configurations can also be employed.

Thus, generally, in operation, when operating in an open mode, force applied to sliding plate 262 by spring 270 is applied to move leg 220 away from center arm 260. Additionally, when transitioning from an open mode to a closed mode, force applied to move leg 220 towards center arm 260 is applied to compress spring 270, as one skilled in the art will understand.

Figure 3:
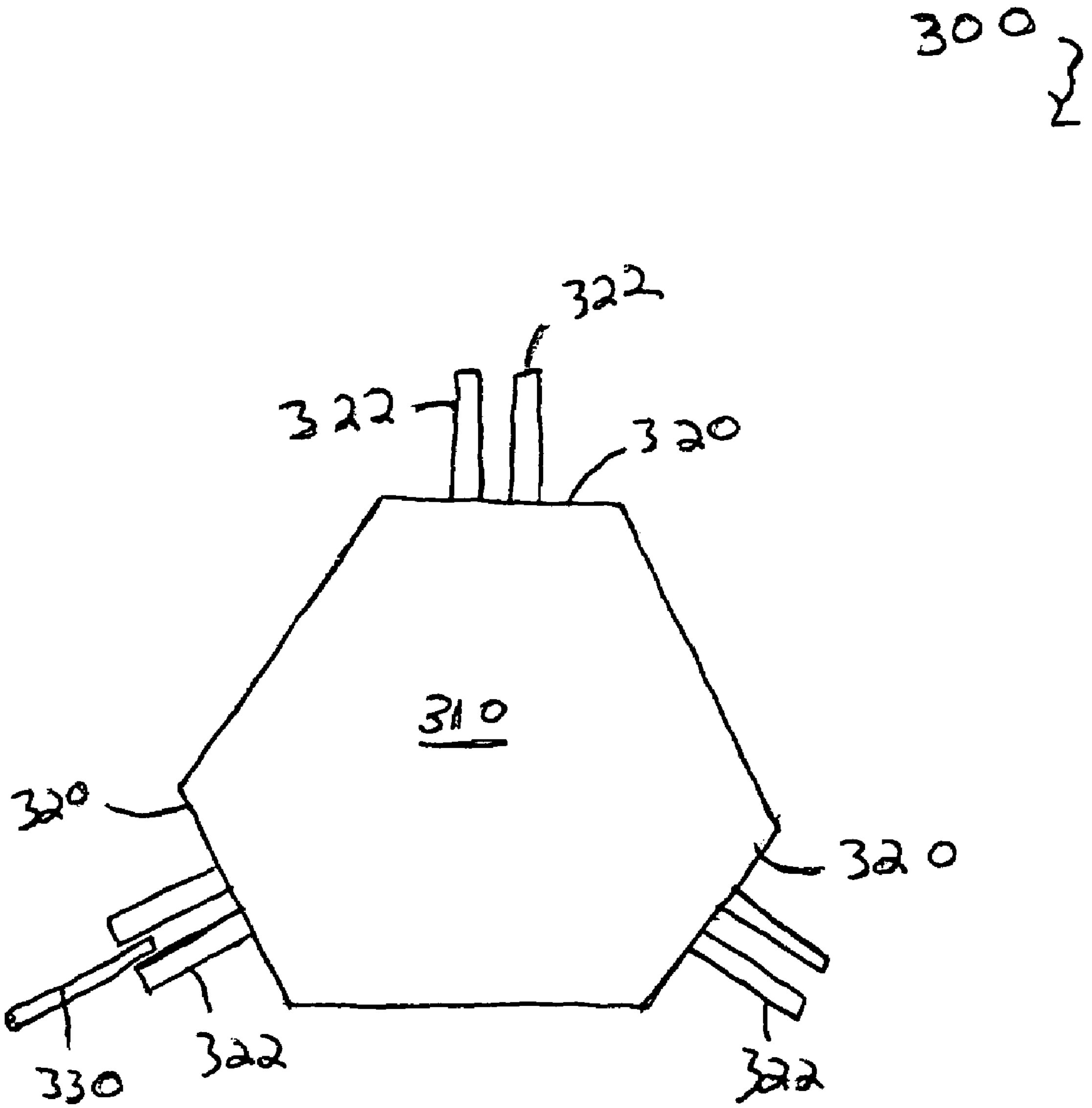
FIG. 3 is block diagram in top view of a top plate of a portable information sign device.

Referring now to FIG. 3, the reference numeral 300 generally designates a top plate, such as, for example, top plate 110 of FIG. 1 and/or top plate 210 of FIG. 2. Top plate 300 includes a top plate foundation 310 and three coupling ports 320. In the illustrated embodiment, top plate foundation 310 is configured as a hexagonal plate. In the illustrated embodiment, each coupling port 320 is configured as a fork-end of a fork-and-pin-type joint. Thus, each coupling port 320 includes two tines 322. One skilled in the art will understand that a pin- or follower-end 330 of a fork-and-pin-type joint can be coupled to coupling port 320 through tines 322.

Figure 4:
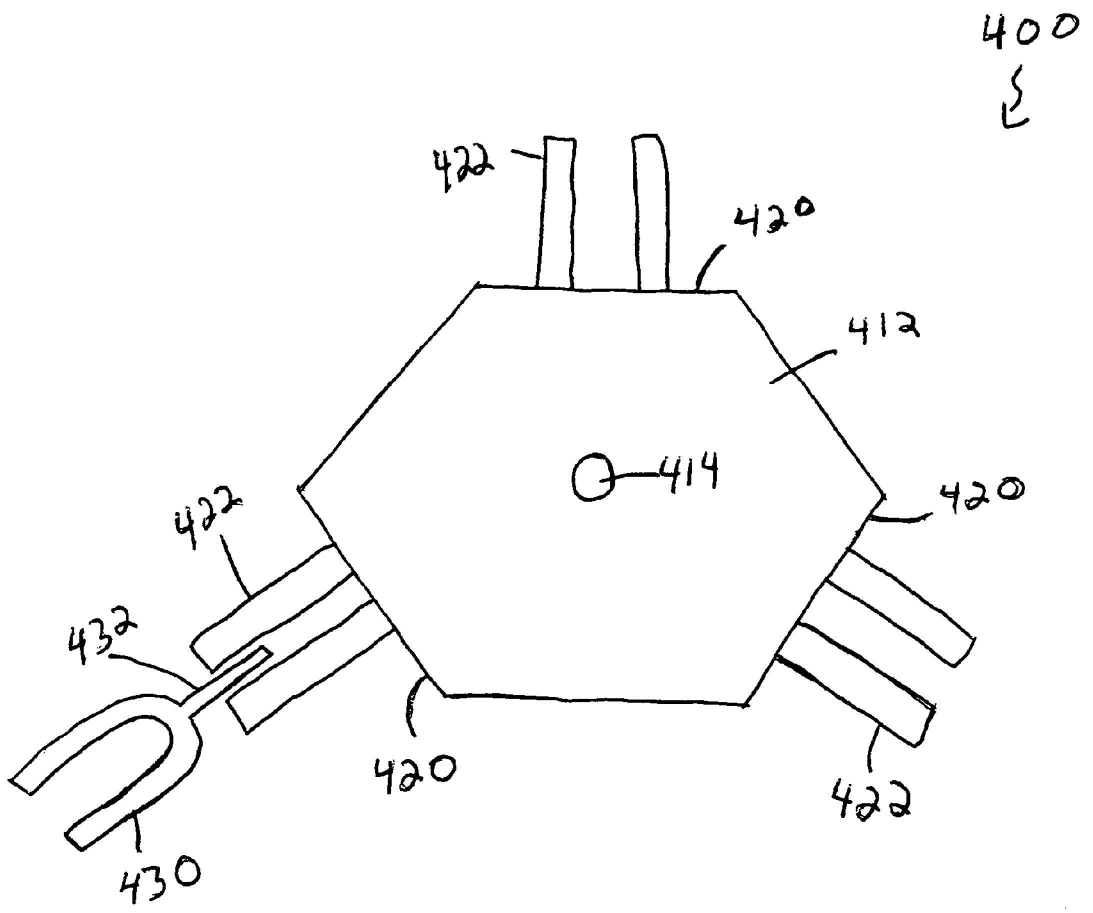
FIG. 4 is block diagram in top view of a portion of a portable information sign device.

Referring now to FIG. 4, the reference numeral 400 generally designates a sliding plate, such as, for example, sliding plate 124 of FIG. 1 and/or sliding plate 262 of FIG. 2. Sliding plate 400 includes sliding plate foundation 412. Sliding plate foundation 412 can be constructed of metal, plastic, or other durable material and can comprise a solid piece, a substantially hollow piece, a somewhat hollow piece, or be otherwise suitably constructed. Sliding plate foundation 412 can be configured as a generally circular plate, a generally triangular plate, a generally hexagonal plate, or otherwise suitably configured. In one embodiment, sliding plate foundation 412 is constructed of a solid metal piece with six sides.

Sliding plate foundation 412 includes aperture 414. Generally, sliding plate foundation 412 is configured to define aperture 414 as a circular aperture, through which a center arm can fit, such as, for example, center arm 120 of FIG. 1 and/or center arm 260 of FIG. 2. As described above, aperture 414 can be configured to receive a hexagonal, triangular, or other non-cylindrical center arm, as one skilled in the art will understand.

Sliding plate 400 includes a plurality of coupling ports 420 coupled to sliding plate foundation 412. In the illustrated embodiment, coupling ports 420 are coupled to sliding plate foundation 412 along a horizontal axis of sliding plate foundation 412. Coupling ports 420 can be constructed from metal, plastic, or other suitable durable, inflexible material. In the illustrated embodiment, each coupling port 420 is configured as a set of prongs or tines 422 to form a fork-end of a fork-and-pin type joint, as one skilled in the art will understand. For example, in the illustrated embodiment, each coupling port 420 is configured to receive a pin- or follower-end 432 of a guide arm 430, as described above.

Figure 5:
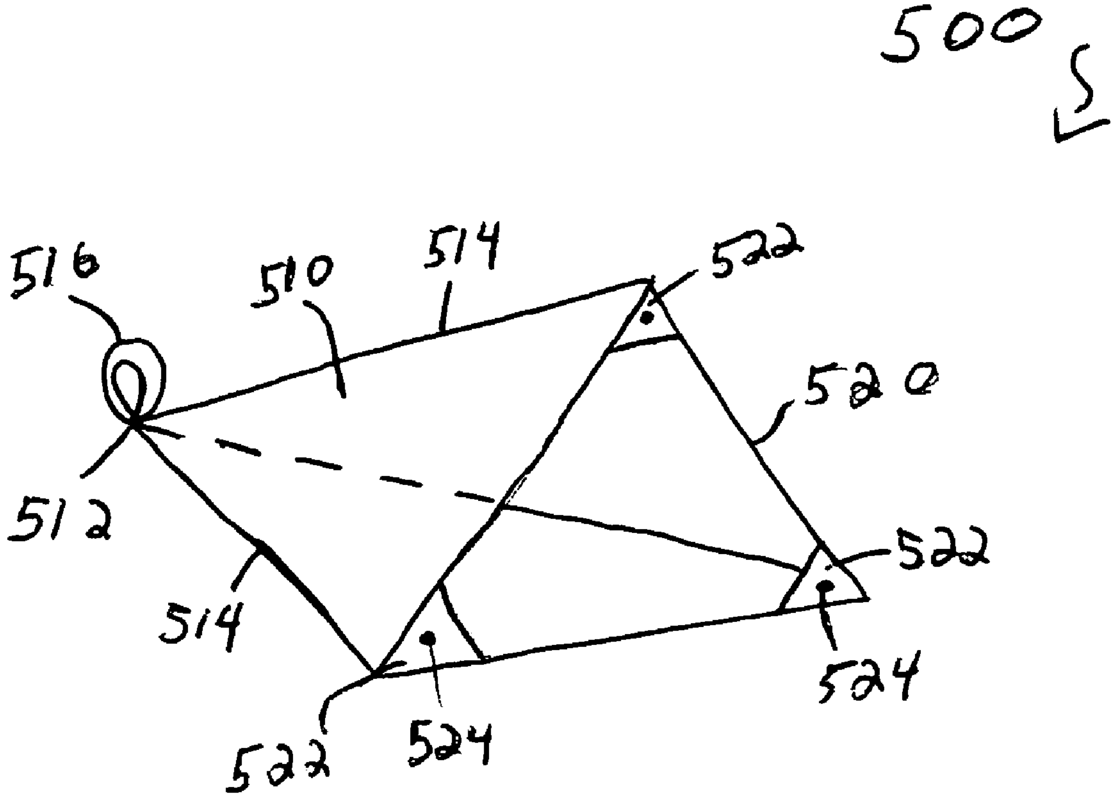
FIG. 5 is a block diagram depicting a portable information sign device.

Referring now to FIG. 5, the reference numeral 500 generally designates a portable information sign, depicted in a bottom view. Generally, portable information sign device 500 is configured as a tetrahedron with three sides 510 of substantially equivalent triangles and one side, a "base" side 520 that is a substantially open side. Each side 510 can be manufactured out of fabric, canvas, plastic, or other flexible material and is configured to receive text, imagery, and/or other suitable signage, as one skilled in the art will understand. In particular, each side 510 can be marked with, for example, "Wet Floor" to indicate the presence of moisture on a floor near where portable information sign 500 and an associated portable information sign device is employed. Thus, the three sides 510 can be configured to provide a safety warning message. In one embodiment, each side 510 includes a safety warning message. In an alternate embodiment, the three sides 510 together comprise a safety warning message. Additionally, one skilled in the art will understand that the text and/or markings applied to a side 510 can convey non-safety-related information, such as, for example, directions to a business location, information regarding a sale or reduced-price event, and/or other information.

In the illustrated embodiment, each side 510 is coupled to each other side at a top corner 512. In the illustrated embodiment, top corner 512 is configured with a point or corner wherein all three sides 510 meet. In an alternate embodiment, top corner 512 can include an aperture through which a j-hook can pass, such as, for example, j-hook 216 of FIG. 2.

Additionally, each side 510 is coupled to another side 510 along a seam 514. Seam 514 can be formed by stitching, zippering, or otherwise suitably coupled. In an alternate embodiment, each side 510 can be formed out of a single piece of fabric, canvas, plastic, or other suitable material and configured to form the three substantially equivalent triangles. One skilled in the art will understand that other configurations can also be employed.

In the illustrated embodiment, a loop 516 is coupled to top corner 512. Loop 516 can be manufactured out of fabric, canvas, plastic, or other suitable flexible material. In operation, loop 516 is configured to allow storage and/or suspension of portable information sign 500 and/or an associated portable information sign device, in a similar fashion, generally, as j-hook 216 of FIG. 2. One skilled in the art will understand that other configurations can also be employed.

In the illustrated embodiment, base side 520 is configured as a substantially open side of the tetrahedron, comprising triangular flaps 522 at the corners of the triangle formed by base side 520. In an alternate embodiment, base side 520 can comprise a substantially continuous panel, similar to side 510, and configured to be modified to receive a portable information sign device, as described in more detail below. In the illustrated embodiment, each triangular flap 522 is configured to receive an end of a leg of a portable information sign device at a coupling port 524. Coupling port 524 is an aperture, eyelet, sleeve, port, or other suitable device configured to receive an end of a leg of a portable information sign device, as described in more detail below.

Generally, in operation, portable information sign 500 is configured to receive a portable information device, such as, for example, portable information sign device 100 of FIG. 1 and/or as embodied in FIG. 2. In particular, portable information sign 500 is configured to receive a portable information sign device through the plane demarcated by base side 520. The top plate of the portable information sign device is inserted into portable information sign 500, to rest in the approximate proximity of top corner 512, and an end of each leg of the portable information sign device is coupled to a coupling port 524. Thus, the portable information sign device can operate as a stable base to display and/or support portable information sign 500. Additionally, in the illustrated embodiment, portable information sign 500 is configured to remain securely attached to an associated portable information sign device whether the portable information sign device is operating in an open mode or a closed mode.

Figure 6:
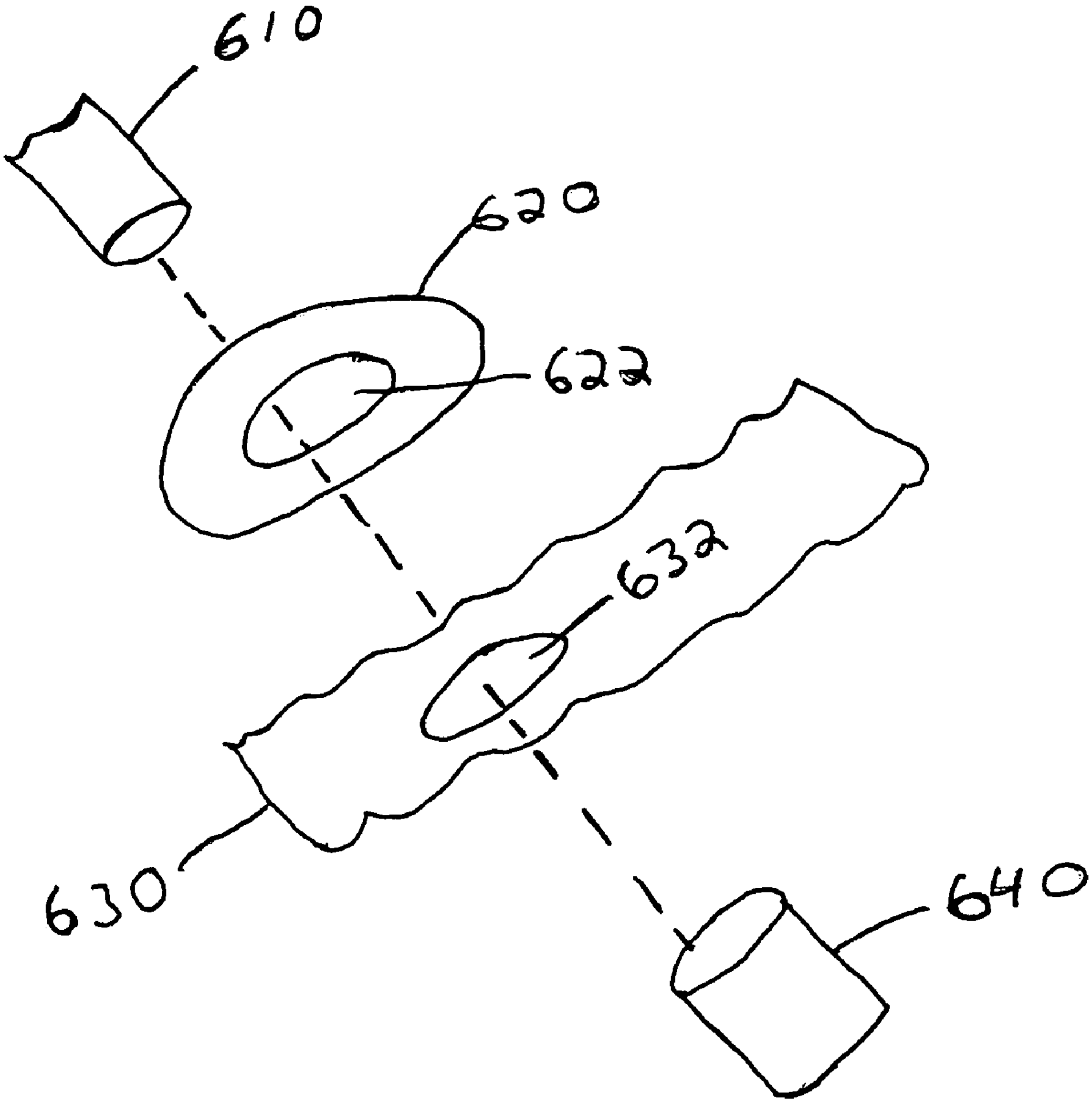
FIG. 6 is a block diagram in expanded view depicting a portable information sign device.

Referring now to FIG. 6, the reference numeral 600 generally designates an expanded view detailing a coupling port of a base side of a portable information sign such as, for example, coupling port 524 of triangular flap 522 of FIG. 5. In particular, FIG. 6 depicts an end 610 of a leg of a portable information sign device distal to the top plate. End 610 is configured to pass through a washer 620 and a base side 630 into an end cap 640.

In particular, in the illustrated embodiment, washer 620 includes an aperture 622 that is configured to receive end 610, as one skilled in the art will understand. In one embodiment, aperture 622 can be threaded to couple securely to end 610. Additionally, base side 630 is configured with an aperture 632 that is configured to receive end 610. In one embodiment, aperture 632 can be reinforced with a metal or plastic eyelet, as one skilled in the art will understand. Thus, washer 620 and end cap 640 can be configured to couple end 610 of a portable information sign device to base side 630 of a portable information sign, as described above.

Accordingly, a portable information sign can be coupled to a portable information sign device as described above that can be employed to increase awareness of hazardous situations without requiring excessive or burdensome storage space. Additionally, deployment and storage of a portable information sign device can be improved, increasing usability to operators charged with promptly alerting passers-by of temporary hazards, or otherwise providing helpful information to such passers-by.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A portable information sign device, comprising: a top plate comprising a top plate foundation and three top plate coupling ports;

a center arm coupled to the top plate, comprising an arm rod axially coupled to the top plate foundation of the top plate, the arm rod comprising a first end coupled to the top plate foundation of the top plate and a distal end, a sliding plate slideably coupled to the arm rod and comprising a sliding plate foundation and three sliding plate coupling ports, a spring comprising a first end and a second end, the first end of the spring axially coupled to the sliding plate foundation and the spring encircling the arm rod, and a stop coupled to the distal end of the arm rod and the second end of the spring;

a first guide arm coupled to a first coupling port of the sliding plate and comprising a sliding plate end and a leg end;

a second guide arm coupled to a second coupling port of the sliding plate and comprising a sliding plate end and a leg end;

a third guide arm coupled to a third coupling port of the sliding plate and comprising a sliding plate end and a leg end;

a first leg comprising a first end rotably coupled to a first coupling port of the top plate, a guide arm coupling port rotably coupled to the leg end of the first guide arm, and a distal end;

a second leg comprising a first end rotably coupled to a second coupling port of the top plate, a guide arm coupling port rotably coupled to the leg end of the second guide arm, and a distal end;

a third leg comprising a first end rotably coupled to a third coupling port of the top plate, a guide arm coupling port rotably coupled to the leg end of the third guide arm, and a distal end; and a portable information sign, comprising:

a first substantially triangular panel comprising a top corner, a first bottom corner, and a second bottom corner;

a second substantially triangular panel comprising a top corner, a first bottom corner, and a second bottom corner, the top corner of the second substantially triangular panel coupled to the top corner of the first substantially triangular panel, the first bottom corner of the second substantially triangular panel coupled to the second bottom corner of the first substantially triangular panel;

a third substantially triangular panel comprising a top corner, a first bottom corner, and a second bottom corner, the top corner of the third substantially triangular panel coupled to the top corner of the first substantially triangular panel and the top corner of the second substantially triangular panel, the first bottom corner of the third substantially triangular panel coupled to the second bottom corner of the second substantially triangular panel, the second bottom corner of the third substantially triangular panel coupled to the first bottom corner of the first substantially triangular panel;

the first bottom corner of the first substantially triangular panel and the second bottom corner of the third substantially triangular panel coupled to the distal end of the first leg;

the second bottom corner of the first substantially triangular panel and the first bottom corner of the second substantially triangular panel coupled to the distal end of the second leg; and the second bottom corner of the second substantially triangular panel and the first bottom corner of the third substantially triangular panel coupled to the distal end of the third leg.

2. The portable information sign as recited in claim 1, wherein:

the first substantially triangular panel further comprises a first edge, a second edge, and a bottom edge;

the second substantially triangular panel further comprises a first edge, a second edge, and a bottom edge, the first edge of the second substantially triangular panel coupled to the second edge of the first substantially triangular panel; and the third substantially triangular panel further comprises a first edge, a second edge, and a bottom edge, the first edge of the third substantially triangular panel coupled to the second edge of the second substantially triangular panel, and the second edge of the third substantially triangular panel coupled to the first edge of the first substantially triangular panel.

3. The portable information sign as recited in claim 1, wherein each of the first substantially triangular panel, the second substantially triangular panel, and the third substantially triangular panel further comprise a safety warning message.

4. The portable information sign device as recited in claim 1, wherein each of the top corner of the first substantially triangular panel, the top corner of the second substantially triangular panel, and the top corner of the third substantially triangular panel are coupled to the top plate foundation of the top plate.

5. The portable information sign device as recited in claim 1, further comprising a j-hook axially coupled to the top plate foundation of the top plate and wherein each of the top corner of the first substantially triangular panel, the top corner of the second substantially triangular panel, and the top corner of the third substantially triangular panel are coupled to the j-hook.

6. The portable information sign as recited in claim 1, wherein each of the first substantially triangular panel, the second substantially triangular panel, and the third substantially triangular panel comprise a plastic cloth.

7. The portable information sign as recited in claim 1, wherein each of the first substantially triangular panel, the second substantially triangular panel, and the third substantially triangular panel comprise a canvas cloth.

8. The portable information sign device as recited in claim 1, wherein each of the top plate, center arm, first guide arm, second guide arm, third guide arm, first leg, second leg, and third leg comprise metal.

9. The portable information sign device as recited in claim 1, wherein each of the top plate, center arm, first guide arm, second guide arm, third guide arm, first leg, second leg, and third leg comprise plastic.

10. The portable information sign device as recited in claim 1, wherein the top plate foundation, is configured as a circular plate.

11. The portable information sign device as recited in claim 1, wherein the top plate foundation is configured as a substantially triangular plate.

12. The portable information sign device as recited in claim 1, wherein the top plate foundation is configured as a hexagonal plate.

13. The portable information sign device as recited in claim 1, wherein the sliding plate is configured as a circular plate.

14. The portable information sign device as recited in claim 1, wherein the sliding plate is configured as a triangular plate.

15. The portable information sign device as recited in claim 1, wherein the sliding plate is configured as a hexagonal plate.

16. The portable information sign device as recited in claim 1, further comprising a flexible loop coupled to the top corner of the first substantially triangular panel.

17. The portable information sign device as recited in claim 16, further comprising a j-hook coupled to the flexible loop.

18. The portable information sign device as recited in claim 1, wherein the center arm further comprises a retainer coupled to the arm rod between the first end of the arm rod and the sliding plate.

19. The portable information sign device as recited in claim 1, further comprising a j-hook axially coupled to the top plate foundation of the top plate.

20. The portable information sign device as recited in claim 1, wherein each of the three coupling ports of the top plate comprise a fork-and-pin type joint.

21. The portable information sign device as recited in claim 1, wherein each of the three coupling ports of the sliding plate comprise a fork-and-pin type joint.

22. The portable information sign device as recited in claim 1, further comprising:

a first end cap coupled to the distal end of the first leg;

a second end cap coupled to the distal end of the second leg; and a third end cap coupled tote distal end of the third leg.

23. The portable information sign device as recited in claim 1, wherein the first guide arm further comprises a first prong and a second prong, the second guide arm further comprises a first prong and a second prong, and the third guide arm further comprises a first prong and a second prong.

* * * * *

UNITED STATES PATENT AND TRADEMARK OFFICE

CERTIFICATE OF CORRECTION

PATENT NO. : 7,392,610 B2
APPLICATION NO. : 11/087145
DATED : July 1, 2008
INVENTOR(S) : Maya Paulina Jedlicka, Wing Yue Leung and Johnny Wayne Boudreaux It is certified that error appears in the above-identified patent and that said Letters Patent is hereby corrected as shown below:

Column 2, Line 21, delete the word - “portablR”

and replace it with --portable--

Column 12, Line 12, delete the word - “tote”

and replace it with --to the--

Signed and Sealed this

Fourteenth Day of October, 2008

JON W. DUDAS
*Director of the United States Patent and Trademark Office*